(12) United States Patent
Mizuno et al.

(10) Patent No.: US 7,578,181 B2
(45) Date of Patent: Aug. 25, 2009

(54) METHOD FOR CORRECTING CONCAVE-CONVEX EXHIBITED ON A SURFACE OF A BODY OF ROTATION

(75) Inventors: Tomohiro Mizuno, Kodaira (JP); Norihiro Honda, Kodaira (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 153 days.

(21) Appl. No.: 11/911,766

(22) PCT Filed: Apr. 14, 2006

(86) PCT No.: PCT/JP2006/307965
§ 371 (c)(1),
(2), (4) Date: Oct. 17, 2007

(87) PCT Pub. No.: WO2006/112409
PCT Pub. Date: Oct. 26, 2006

(65) Prior Publication Data
US 2009/0049902 A1 Feb. 26, 2009

(30) Foreign Application Priority Data
Apr. 18, 2005 (JP) .............................. 2005-120362

(51) Int. Cl.
*G01M 17/02* (2006.01)
(52) U.S. Cl. ...................................................... 73/146
(58) Field of Classification Search ........ 73/146–146.8; 340/442–447
See application file for complete search history.

(56) References Cited

U.S. PATENT DOCUMENTS 4,173,073 A * 11/1979 Fukazawa et al. ............. 33/1 Q
5,926,781 A 7/1999 Scott
6,098,452 A * 8/2000 Enomoto ...................... 73/104

(Continued)

FOREIGN PATENT DOCUMENTS

EP 0 068 082 A2 1/1983

(Continued)

*Primary Examiner*—Lisa M Caputo
*Assistant Examiner*—Jermaine Jenkins
(74) *Attorney, Agent, or Firm*—Sughrue Mion, PLLC

(57) ABSTRACT

Providing a method for correcting a data of irregularity of a surface of a body of rotation with an eccentricity included to a data being not affected by eccentricity. The distance data $L_k$ between the tire crown portion $10t$ of the tire $10t$ to be inspected and the distance sensor is measured at each of measurement points $X_k$ at every angular displacement $\Delta\theta$ in a circumferential direction of the tire and also radius value $r_k$ are computed from the above distance data $L_k$ and the distance $L_D$ between the center of rotation of the tire and the distance sensor; and further the surface length $S_k$ is computed by integrating the radius value $r_k$ with respect to $\Delta\theta$ from the measurement starting point to a current measurement point k and the irregularity data is converted into the form of $(X_k, r_k)$ and then the radius values $R_k$ at the irregularity computing points $X_k$ dividing the one round surface length $S_k$ of the tire into equal intervals are computed based on the radius values $r_k$ and $r_k+1$ at the measurement points $X_k$ and $X_k+1$ adjacent to the irregularity computing point $X_k$, serving as an irregularity data $(X_k, R_k)$ at respective points dividing the surface of the tire crown portion into equal intervals circumferentially the tire.

2 Claims, 5 Drawing Sheets

U.S. PATENT DOCUMENTS 6,564,466 B2 * 5/2003 Uwai ........................... 33/549
2008/0079593 A1 * 4/2008 Yutaka ....................... 340/665

FOREIGN PATENT DOCUMENTS

| | | | |
|---|---|---|---|
| JP | 51-16067 A | 2/1976 | |
| JP | 57-207813 A | 12/1982 | |
| JP | 2-105007 A | 4/1990 | |
| JP | 04025743 A | * | 1/1992 |
| JP | 10-507268 A | 7/1998 | |
| JP | 2002-162222 A | 6/2002 | |

* cited by examiner

INTERVALS EQUALLY DIVIDED

METHOD FOR CORRECTING CONCAVE-CONVEX EXHIBITED ON A SURFACE OF A BODY OF ROTATION

BACKGROUND OF THE INVENTION

1. Field of the Invention

The present invention relates to a method for measuring concave-convex (hereinafter, "concave-convex" is referred to read as "irregularity") exhibited on a surface of a body of rotation such as a tire and especially relates to correction of data of irregularity taken successively at every equal angle around an axis of rotation.

2. Description of the Related Art

Conventionally, as one of external appearance inspection on a finished tire carried out at the time of shipping produced tires, inspections of condition of irregularities exhibited on a tire side portion or on a tire crown portion has been performed. (For example, make reference to patent documents 1 and 2).

FIG. 4 shows an example of constitution of an apparatus 50 for inspecting irregularities exhibited on a tire side portion, and this inspection apparatus 50 is operated such that after mounting the tire 10 to be inspected on the limb 52n of the tire holding device 52 coupled to the rotary driving device 51, the tire is filled to a predetermined internal pressure and the distance between the surface of the tire side portion 10S of the tire 10 and the non-contact displacement probe 53, which is positioned in vicinity of the tire side portion 10S and provided with LED and laser, is measured at a predetermined sampling interval while the tire is being rotated at a constant rotational speed. The non-contact displacement probe 53 measures, with non-contacting, the distance from this probe 53 to the tire side portion 10S by receiving an inspection light irradiated to the tire side portion 10S and reflected therefrom. Thereby condition of irregularity exhibited on the tire side 10S is measured and the measured distance data is forwarded to the control and processor unit 54 and converted to an irregularity data of the tire side 10S.

Also, the irregularity inspection apparatus 50 has the $2^{nd}$ non-contacted displacement probe 55, which is arranged at the position facing the tire crown portion 10t. Though, in the irregularity inspection apparatus 50, the diameter of the tire is measured by measuring the distance between $2^{nd}$ non-contacted displacement probe 55 and the tire crown portion 10t, it is possible to measure the condition of irregularity exhibited on the surface of the tire crown portion 10t as well as the tire side portion 10S by utilizing the $2^{nd}$ non-contact displacement probe 55.

In case of measuring the irregularity on the surface of the tire crown portion 10t having the tire tread pattern such as a block pattern by means of the non-contact displacement probe 55, as shown in FIG. 5, the radius value $r_k$ presenting the irregularity value rk at the k th measurement point on the surface of the tire crown portion 10t can be given by the relation, $r_k = L_0 - L_k$ wherein $L_k$ denotes the above distance data and $L_0$ denotes the distance between the center of rotation of the tire 10 and the sensor 14. Accordingly, upon storing design value of the radius value $R_{k0}$ at each of measurement points $X_k$ (k=1~N) on the tire 10 and the above L0 as constant values in advance, the difference value $\Delta r_k$ between the radius value $r_k$ at each measurement point $X_k$ on the tire crown portion 10t and the above design value $R_{k0}$ can be computed. Then, when the value of $\Delta_{rk}$ exceeds a predetermined value, existence of abnormality on irregularity is considered. Therefore, by measuring the radius value $r_k$ Of the tire crown portion 10t the abnormality of the irregularity exhibited on the tire crown portion 10t such as irregularity on the pattern block of the contact patch can be detected.

[Patent Document 1]
Japanese laid open publication document No. 2004-361344
[Patent Document 2]
Japanese laid open publication document No. 2005-501245

However, according to the foregoing method, in the case where the tire 10 is arranged eccentrically with the center of rotation of the inspection apparatus which is the rotation axis of the rotary driving device 51, the measurement points $X_k$ can not be placed at equal intervals as shown by FIGS. 6 (a) and (b). In other words, as depicted by A~B, D~A in the same drawing, the surface located at the portion near the center of rotation of the inspection apparatus swells and the one located at the portion for away therefrom as depicted by B~D shrinks resulting in giving rise to a problem of the measurement data including the surface swelled or shrinked affected by the existence of the eccentricity.

Since it was difficult to grasp the amount of eccentricity accurately, currently it is obliged to accept the result of measurement in which the condition of eccentricity is involved. Accordingly, when a comparison with a normal tire utilized as a standard as to the irregularity of surface, it is impossible to distinguish the cause of discrepancy on the irregularity whether it is resulted from the defectiveness of the tire or from the eccentricity, and such a condition has been an obstacle for an automatic inspection of irregularity of surface of the tire.

In this instance, it is considered to overcome the difficulty due to the eccentricity by modifying the constitution (hardware) of the inspection apparatus, it is a cost consuming task and further when a amount of eccentricity can not be grasped accurately, it is hardly possible to remove effect caused by the eccentricity completely.

The present invention has been made to cope with the problem in the related art and the object thereof is to provide a method for correcting the data of the irregularity exhibited on the surface of a body of rotation, in which difficulty of eccentricity is involved, into the data devoid of effect due to the eccentricity.

SUMMARY OF THE INVENTION

As a result of earnestly conducted studies of inventors, they found the possibility of obtaining data of irregularity of a surface free from the effect due to the eccentricity by utilizing the data, which has been obtained by computing the surface irregularity data at the positions spaced by equal intervals in a circumferential direction by interpolation from the irregularity data of the surface swelled and shrieked at measurement positions, for the irregularity data of the surface at the position on the surface of the body of rotation taken at positions spaced with equal intervals.

The invention as stated in claim 1 according to the present invention provides a method for correcting an irregularity data of a surface of a body of rotation obtained by rotation either one of the body of rotation or a non-contact displacement probe located at a position facing the surface of the body of rotation, and the method is characterized in comprising steps of measuring the irregularity values of the surface of the body of rotation or the displacement probe from center of the rotation with equal angular displacement, computing a surface length of the body of rotation from a measurement starting point to an arbitral measurement point and bringing the surface length correspond with the measured irregularity values, dividing the computed one round length of the tire into equal intervals, and making each of equally spaced points as the irregularity computing points for newly computing irregularity values, computing the irregularity value at each of irregularity computing points based on the irregularity data at the measurement points adjacent to irregularity computing point making the irregularity values at respective measurement points as the irregularity data of the surface of the body of rotation at respective points equally spaced apart.

The invention as stated in claim 2 of the present invention is characterized in that in the method for correcting the irregularity data of a surface of a body of rotation according to claim 1, the surface length is computed by integrating the distance between the center of rotation and respective measurement points with respect to the displacement angle.

According to the present invention, at the time of correcting the irregularity data of a surface of a body of rotation obtained by rotating either one of this body of rotation or a non-contact displacement probe located at a position facing surface of the body of rotation, length of the surface of the rotation extending from starting point of the measurement to an arbitrary measurement point is computed so as to bring the foregoing length of the surface to correspond with the measured value of irregularity, the above computed length of one round is divided into equal arcs so as to obtain points spaced with equal intervals, thus produced points are utilized as the irregularity computing points for newly computing the value of irregularity, the value of irregularity at the irregularity computing points are computed based on the data of irregularity at the measurement points adjacent the above irregularity measurement point and this computed irregularity value is used as the irregularity data at the positions spaced apart by equal intervals, and therefore the irregularity data on the surface of body of rotation with an eccentricity can be corrected to the data of irregularity free from the effect due to the eccentricity.

Also by applying the foregoing method of correction to an automate measurement apparatus to be used for measurement of irregularity of surface of a body of rotation such as inspection of irregularity of surface of a tire crown portion, it is possible to correct the measured data based on the obtained measurement data, thereby enabling to automate the measurement of irregularity of surface of a body of rotation.

DETAILED DESCRIPTION OF THE PREFERRED EMBODIMENTS

Hereinafter, description on the preferred embodiment of the present invention is given.

FIG. 1 is a block diagram for showing outline of an automatic inspection apparatus for external appearance of tire 10 illustrated as the preferred embodiment according to the present invention. In this embodiment, the inspection apparatus 1 performs the inspection of the condition of irregularity of the surface of the tire crown portion.

In this drawing, the numeral 11 denotes a tire holding unit for holding a rim carrying the tire 10 to be inspected, 13 denotes a rotary driving device coupled to the tire holding unit and for rotating the tire 10 at a constant speed, 14 denotes a non-contact type distance sensor positioned closely to the tire crown portion of the tire 10, and 15 denotes a control and processor unit for the rotary driving device 13 and for carrying out an external appearance inspection of the tire 10 by computing value of the irregularity of the surface of the tire 10 based on the distance data between the distance sensor 14 and the tire crown portion 10 measured by the distant sensor 14. In this Embodiment, the tire is rotated at a contact angular velocity (e.g., 1°/sec) and sampling mode on the tire crown portion 10 at angular displacement $\Delta\theta$ (e.g., 0.035°) and thus the value of irregularity of the surface of the tire crown portion 10$t$ is obtained.

In detail, the foregoing control and processor device 15 comprises a radius value computing unit 15$a$, a surface length computing unit 15$b$, surface irregularity value computing unit 15$c$, a judgement unit 15$d$ and a rotation control unit 15$e$. The radius value computing unit 15$a$ computes the value of irregularity, $r_k$ (hereinafter, "value of irregularity" is called as "radius value"), which is nothing but the distance extending from the center of tire (actually, center of rotation of tire 10) to the surface of the tire crown portion 10$t$ based on the distance data $L_k$ (k=1~N) between the distance sensor 14 and the measurement point $X_k$ measured by the measurement sensor 14. The surface length computing unit 15$b$ computes the surface length $S_k$, and in this computation the above surface length of one round $S_N$ is divided into portions having equal length so that new points spaced apart by equal intervals are produced and those points are designated as the irregularity value computing point $X_k$ and the radius value $R_k$ to be computed by the computing unit 15$c$ is computed based on the radius values $r_k$ and rk+1 at the two measurement points $X_k$ and $X_k$+1 located in vicinity of the foregoing irregularity computing points $X_k$. The rotation control unit 15$e$ controls the rotation control device 13. Thus, the control and processor apparatus 15 computes the irregularity value of the tire crown portion 10$t$ of the tire 10 based on the distance data $L_k$ between the distance sensor 14 and the tire crown portion 10$t$ measured by the distance sensor 14, thereby judge the abnormality in the irregularity of the tire 10.

Next, the method of correcting the data of irregularity of the surface of a body of rotation is described with reference to the flowchart as given in FIG. 2.

Firstly, after mounting the tire 10 to be inspected to the rim 12 of the holding portion 11 of the tire 10, the distance between the tire crown portion 10$t$ and the distance sensor 14 is measured at every angular displacement $\Delta\theta$ by the non-contact distance sensor 14 while the tire is being rotated at a predetermined angular velocity W by controlling the rotary driving device 13 as shown by FIG. 3($a$), the measured distance L is stored as distance data $L_k$ in the storage device 15M (step 10).

Next, by means of the radius computing unit 15$a$, the radius value $r_k$ is computed from the distance data $L_k$ at the measurement point $X_k$ (k=1~N) and the distance $L_0$ extending from the center of rotation of the tire 10 to the distance sensor (step S11). After bring the measurement point $X_k$ to correspond with the radius value $r_k$ (step S12) through computation of the surface length $S_k$ by integrating the radius value $r_k$ extending from the measurement starting point to the current measurement point k taken by $\Delta\theta$, as shown by FIG. 3($b$) the surface length by one round $S_N$ of the tire is divided into equal length, the points spaced apart equal intervals due to the foregoing division of the surface length are used for the irregularity computing points $X_k$ for newly computing radius value $R_k$ (step S13), and then the radius values $R_k$ at respective irregularity computing points $R_k$ are computed (step S14). Concretely speaking, as shown by FIG. 3($c$) the radius value $R_k$ is computed based on the radius values $r_k$ and $r_k$+1 at those two measurement points $X_k$ and $X_k$+1 adjacent to the irregularity computing point $X_k$ (step S14). For computing the radius value $R_k$, for example, letting $D_k$ and $D_k$+1 be the distance between the irregularity computing points $X_k$ and the foregoing two measurement points $X_k$ and $X_k$+1 adjacent to the above point $X_k$, respectively, namely denoted as $D_k$ and $D_k$+1, then a method of obtaining the radius value $R_k$ by weighting the radius values $r_k$ and $r_k$+1 with respect to the measurement points $X_k$ and $X_k+1$ can be considered. In this manner, as shown by FIG. 3(d) the surface irregularity data $(X_k, R_k)$ at the positions equally spaced apart there between on the surface of the tire crown portion 10t can be obtained.

At the judging unit 15d, upon comparing the above obtained data $(X_k, R_k)$ with the surface irregularity data $(X_k, R_{k0})$ of a standard tire stored in the storage unit 15M beforehand, whether abnormality in irregularity exists in the tire 10 or not is judged. In this manner, the abnormality in irregularity exhibited on the tire crown portion 10t of the tire 10 can be judged accurately.

In this manner, according to the preferred embodiment, the distance data $L_k$ between the tire crown portion 10t of the tire 10 to be inspected is measured at each measurement point $X_k$ displaced by every $\Delta\theta$ in a circumferential direction of the tire and the radius value is computed from the foregoing distance data $L_k$ and the distance $L_0$ between the center of rotation of the tire and the sensor; further, the radius value $r_k$ is integrated with respect to $\Delta\theta$ from starting point of measurement to the current measurement point k so as to obtain the surface length S'k and the data of irregularity is converted into the form of $(X_k, r_k)$. Then, the radius value $R_k$ at the irregularity computing points $X_k$, which is divided the one round surface length $S_N$ of the tire crown portion 10t into equal intervals, is computed based on the radius value $r_k$ and $r_k+1$ obtained at measurement points $X_k$ and $X_k+1$ adjacent to the irregularity computing points $X_k$ and thus obtained measurement values are presented as the irregularity data $(X_k, R_k)$ at the positions spaced by equal intervals on the surface of the tire crown portion 10t, and as a result, the data of irregularity free from swelling or shrinkage can be obtained.

And further, by computing the foregoing irregularity data $(X_k, R_k)$ with the surface irregularity data $(X_k, R_{k0})$ of a standard tire, the abnormality in irregularity of the tire crown portion of a tire 10 can be judged accurately, and therefore the external appearance inspection of a tire can be automated.

Since the inspection apparatus according to the embodiment can remove the effect due to the eccentricity without modifying the hardware, the inspection apparatus has an advantage of not incurring cost for modification of hardware.

In the foregoing, though the description was given in the case where the measurement of irregularity on the surface of the crown portion 10t of the tire 10 in a circumferential direction of the tire, by obtaining the irregularity data $(X_k, R_k)$ in the widthwise direction, an accurate cross sectional configuration of the tire can be obtained. And further, by obtaining both of the data in a circumferential direction and in a widthwise direction the configuration of the crown portion 10t of the tire can be reproduced three-dimensionally and hence, by comparing this tree dimensional data with the three dimensional CAD data, further detailed external appearance inspection can be feasible.

Also, in the foregoing example description in the case where the inspection was carried out on the surface of the tire crown portion 10t was given and nevertheless the present invention is not limited to the inspection as given in the case, the correction can be applicable to the data obtained by measuring the irregularity of the surface of a body in general of rotation.

INDUSTRIAL FEASIBILITY

According to the present invention, since the irregularity data of a surface of a body of rotation affected by an eccentricity can be corrected to irregularity data being not affected by eccentricity, an accurate data of irregularity of a surface of a body of rotation can be obtained easily. And also the correction method of the present invention makes feasible to automate the correction of an irregularity of surface of a body of rotation easily.

Figure 1:
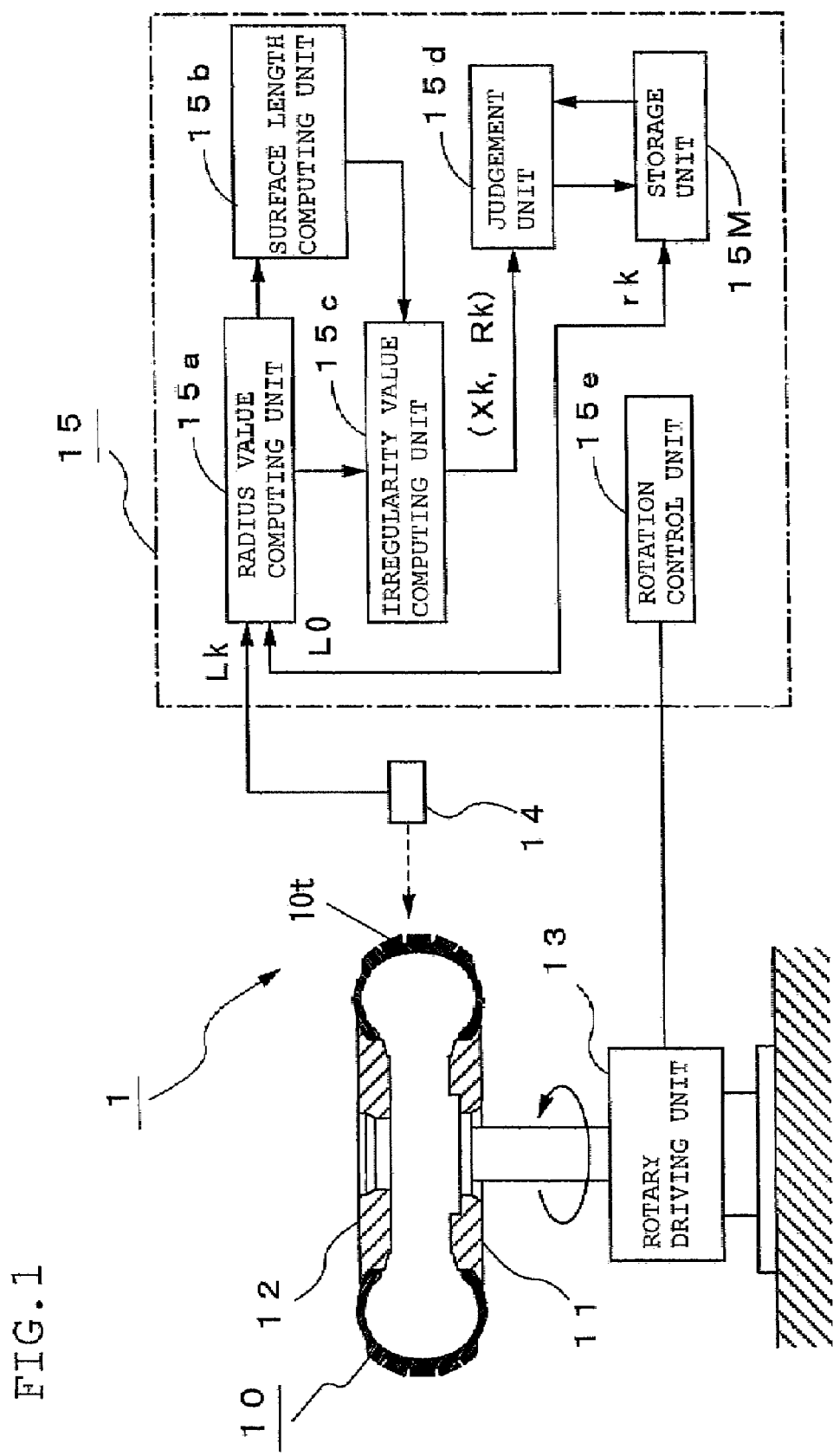
FIG. 1 is a functional block diagram showing outline of the automatic inspection apparatus for external appearance of a tire related to the preferred embodiment of the present invention.
Figure 2:
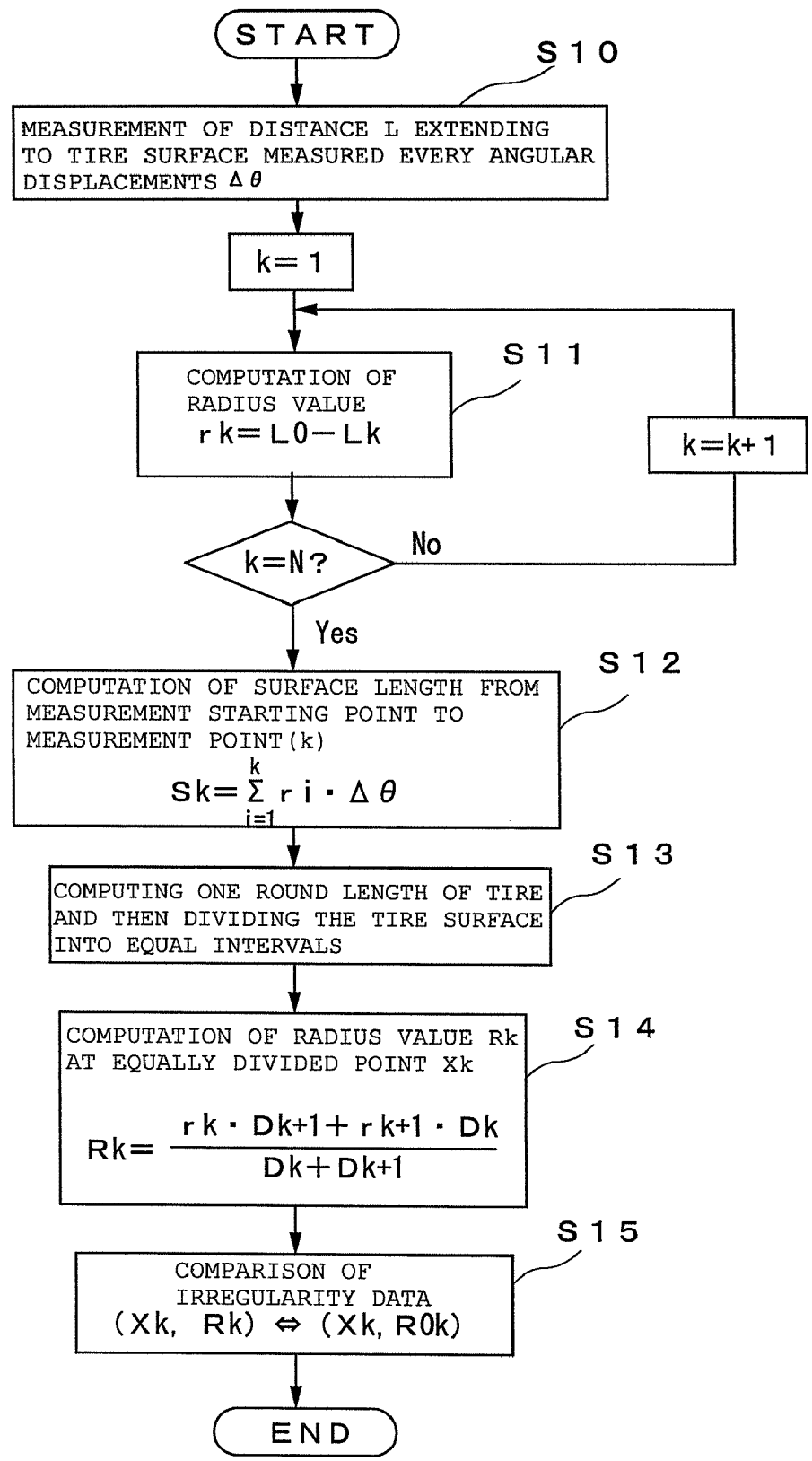
FIG. 2 is a flowchart showing method of correcting the irregularity data of the tire crown portion related to the preferred embodiment.
Figure 3A:
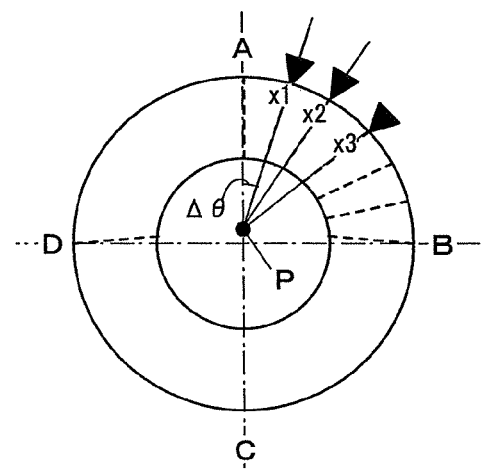
FIG. 3(a)-(d) shows a method for correcting an irregularity data related to the preferred embodiment.
Figure 3B:
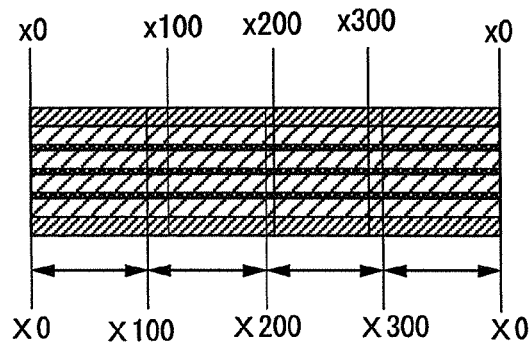
Figure 3C:
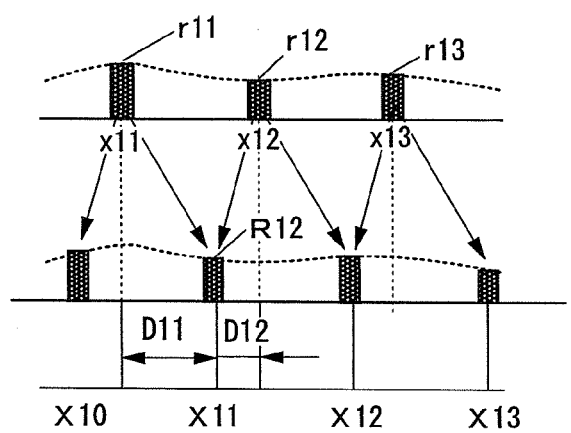
Figure 3D:
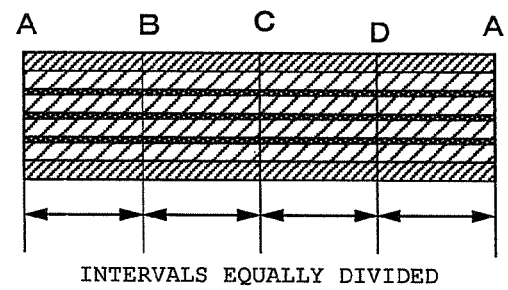
Figure 4:
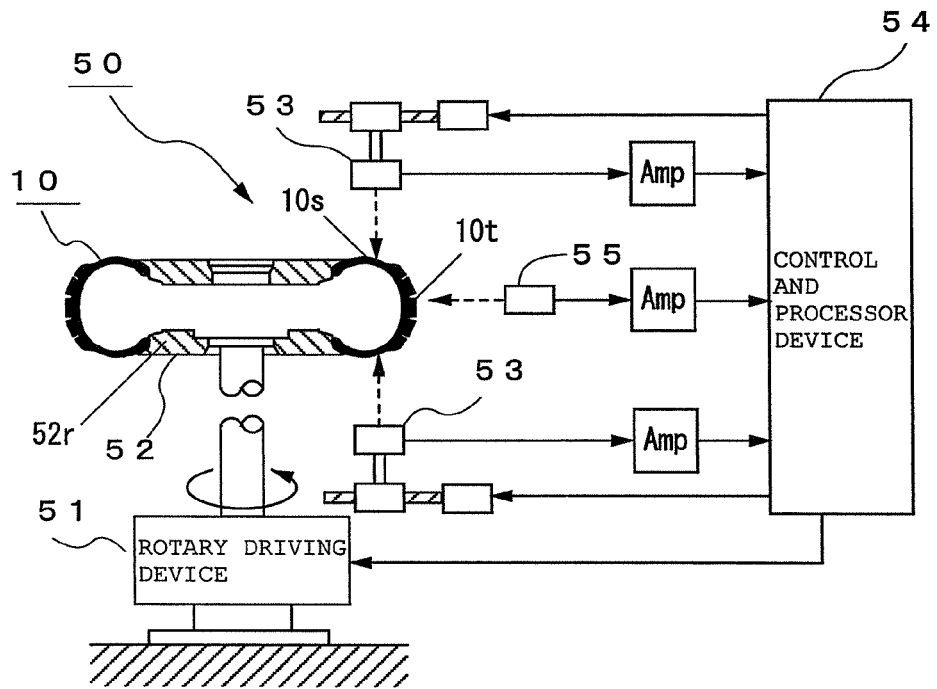
FIG. 4 shows a method for correcting an irregularity data of the tire side portion in a related art.
Figure 5:
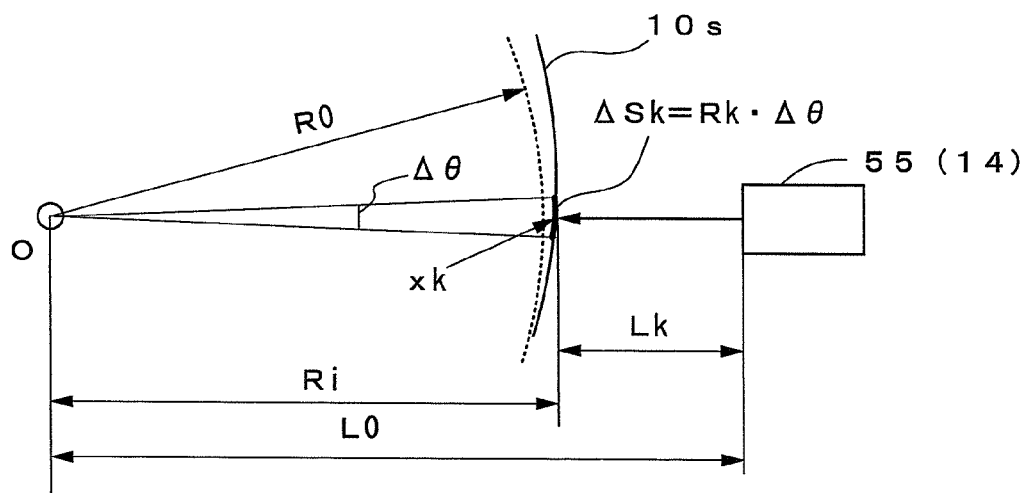
FIG. 5 shows a method for measuring an irregularity data by a non-contact displacement probe.
Figure 6A:
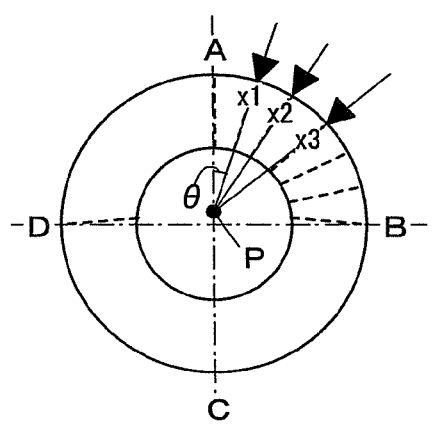
FIGS. 6(a) and (b) shows an irregularity data of a tire crown portion in a related art.
Figure 6B:
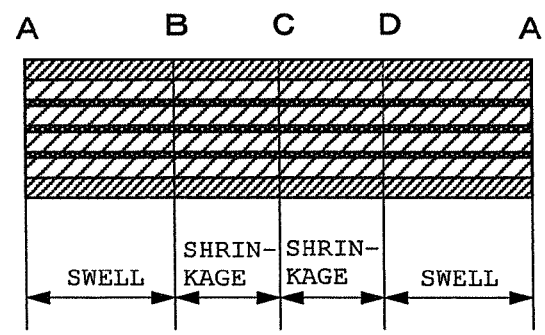

What is claimed is:

1. A method for correcting an irregularity data of a surface of a body of rotation obtained by rotating either one of the body of rotation or a non-contact displacement probe located at a position facing the surface of the body of rotation, comprising steps of:

measuring an irregularity value of the surface of the body of rotation from a center of the rotation of the body of rotation or the center of rotation of the non-contact displacement probe with equal angular displacement;

computing a surface length of the body of rotation from a measurement starting point to an arbitrary measurement point and bringing the surface length to correspond with the measured irregularity values;

dividing the computed one round length of the tire into equal intervals and making each of equally divided points to be irregularity computing points for newly computing irregularity values;

computing the irregularity value at each of irregularity computing points based on the irregularity data at the measurement points adjacent to irregularity computing point, and;

making the irregularity values at respective computing points to be the irregularity data of the surface of the body of rotation at respective points equally spaced apart on the surface of the body of rotation.

2. The method for correcting an irregularity data of the surface of the body of rotation according to claim 1, wherein the surface length is computed by integrating the distance between the center of rotation and respective measurement points with respect to the angular displacement.

* * * * *